United States Patent [19]
Enomoto

[11] 3,864,153

[45] Feb. 4, 1975

[54] WATER RESISTING AND ANTICORROSIVE PAINTING METHOD AND THE PAINTED ARTICLES

[75] Inventor: Satoru Enomoto, Fukushima, Japan

[73] Assignee: Kureha Kagaku Kogyo K.K., Tokyo, Japan

[22] Filed: Jan. 26, 1973

[21] Appl. No.: 326,657

Related U.S. Application Data

[63] Continuation-in-part of Ser. No. 68,553, Aug. 31, 1970, abandoned.

[30] Foreign Application Priority Data

Aug. 30, 1969    Japan................................ 44-68350

[52] U.S. Cl...................... 117/75, 117/72, 117/92, 117/135, 260/33.6 UB
[51] Int. Cl............................................ B32b 15/08
[58] Field of Search ........... 117/75, 72, 132 BE, 92, 117/161 KP, 132 B, 135; 260/33.6 EP, 33.6 UB

[56] References Cited
UNITED STATES PATENTS

| | | | |
|---|---|---|---|
| 2,864,722 | 12/1958 | Millar et al. .......................... | 117/72 |
| 2,906,720 | 9/1959 | Simpson................... | 117/132 BE X |
| 3,062,771 | 11/1962 | Boenau et al............. | 117/132 BE X |
| 3,284,400 | 11/1966 | Nelson et al................. | 260/33.6 EP |
| 3,352,955 | 11/1967 | Pigott et al ........................... | 117/75 |
| 3,390,119 | 6/1968 | Alexander et al.......... | 260/18 TN X |
| 3,625,742 | 12/1971 | Baldwin.................................. | 117/75 |

*Primary Examiner*—Ralph Husack
*Attorney, Agent, or Firm*—Sughrue, Rothwell, Mion, Zinn & Macpeak

[57] ABSTRACT

A painting method which comprises applying to a substrate an undercoating composition comprising from 10 to 500 parts by weight of an alkylated polycyclic aromatic compound containing no nitrogen, oxygen or sulfur to the extent detectable by elementary analysis and having a mean molecular weight measured by the VPO method of from 250 to 600 and an aromatic ring-forming proton density measured by the nuclear magnetic resonance method of from 35 to 80%, and 100 parts by weight of a urethane resin, said undercoating composition further containing a hardening agent and then applying an over-coating composition comprising a curable resin selected from the group consisting of an epoxy resin, a urethane resin, and an alkyd resin.

7 Claims, No Drawings

WATER RESISTING AND ANTICORROSIVE PAINTING METHOD AND THE PAINTED ARTICLES

CROSS-REFERENCE TO RELATED APPLICATION

The present application is a continuation-in-part of co-pending application Ser. No. 68,553, filed Aug. 31, 1970, now abandoned.

BACKGROUND OF THE INVENTION

1. Field of the Invention

The present invention relates to a method of applying water-resisting and anticorrosive paint to a substrate and, more particularly, the present invention relates to a painting method comprising applying to the substrate an undercoating composition comprising a mixture of an alkylated polycyclic aromatic compound and a curable resin and then applying an over-coating composition comprising a curable resin.

2. Description of the Prior Art

Coal tars which have hitherto been used as paint materials have sufficient water resisting and anticorrosive properties and may be satisfactory from this point of view but, in practical use, they encounter various difficulties. That is, they have such faults that the color thereof is black, the quality is not constant, they readily cause bleeding thus making over-coating impossible, etc. Therefore, although coal tars have excellent water-resistance and corrosion-resistance properties, their use is limited to a narrow range.

On the other hand, since petroleum asphalts have an inferior compatibility with resins as compared with coal tars, they are not usually used.

Therefore, an object of this invention is to provide a method for applying a novel paint composition that can overcome the aforesaid difficulties without losing the specific merits of coal tars.

SUMMARY OF THE INVENTION

The present inventor has discovered that by applying to a substrate a mixture of 10 to 500 parts by weight of an alkylated polycyclic aromatic compound and 100 parts by weight of a curable resin, such as a urethane resin as an under-coating material and then applying an over-coating composition containing, as a curable resin, a resin such as an epoxy resin, a urethane resin, or an alkyd resin, a thick paint coating having excellent water resistance and corrosion resistance can be obtained without being accompanied by the undesirable formations of bleeding and other similar disadvantages.

DETAILED DESCRIPTION OF THE PREFERRED EMBODIMENTS

The alkylated polycyclic aromatic compounds having the excellent properties as mentioned above are those compounds in which no oxygen, sulfur or nitrogen is detected by an elementary analysis, and which do no emit, therefore, and offensive odors, and which show a neutral property. Also, it is preferable for the purposes of this invention that the alkylated polycyclic aromatic compounds have a mean molecular weight of from 250 to 600 measured by the VPO method (i.e., a vapor pressureosmotic pressure method), If the mean molecular weight is less than the disclosed range, the viscosity of the aromatic compound is lowered and the volatility thereof is increased, which makes the use of such alkylated polycyclic aromatics undesirable for paint compositions.

On the other hand, if the mean molecular weight of the aromatics is greater than the above range, solidification of the alkylated aromatics occurs due to the increase in the softening point, which is undesirable in operation.

Moreover, it is also desirable that the alkylated polycyclic aromatic compounds have an aromatic ring-forming proton density measured by nuclear magnetic resonance of 35 to 80% (the $\tau$ value of tetramethyl silane is defined to be 10 as the standard and a $\tau$ value of less than 4 represents the aromatic proton). An aromatic ring forming proton density of less than 35% means that the alkylated polycyclic aromatics have long alkyl groups or an increased number of naphthenic rings, which results in reducing the compatibility of the aromatic compounds with the curable resin.

On the other hand, if the aromatic ring forming proton density is higher than 80%, a solidification phenomenon occurs due to the increase of aromaticity.

Furthermore, the general properties of the alkylated polycyclic aromatic compounds used in this invention are as follows: a specific gravity of 0.95 to 1.10, and (if liquid) a viscosity of higher than 2,000 c.p.s. (at 25° C), or (if solid) a softening point of about 25° C.

The alkylated polycyclic aromatic compounds of this invention are derived from, for example, residual oils obtained in the thermal cracking of petroleum fractions at temperatures of higher than 900° C. Typical of such residual oils are a bottom oil obtained from the production of ethylene by the decomposition of a light oil or the residual oil obtained from the production of ethylene and acetylene by the decomposition of petroleum. See, for example, "Hydrocarbon Processing," November, 1969.

To obtain the alkylated aromatics of this invention, the abovedescribed residual oil is first subjected to a conventional hydrodesulfurization treatment. The product is then alkylated and finally, low boiling fractions boiling at less than 380° C are removed from the alkylated product to provide the alkylated polycyclic aromatic compounds of this invention.

Any conventional hydrodesulfurization process can be employed and the process can be conducted in one or two steps. Similarly, any conventional alkylation process is operable. Typical examples of operable hydrodesulfurization and alkylation techniques are as follows:

Conditions of a Typical Hydrodesulfurization Treatment

| | |
|---|---|
| Temperature (°C) | 40 to 450 |
| Pressure (kg/cm$^2$) | 5 to 300 |
| H$_2^{mol}$/Fraction$^{mol}$ | 3 to 15 |
| LHSV (liquid hourly space velocity) | 0.2 to 10 |
| Catalyst: | One or more metals or sulfides of tungsten, molybdenum, nickel, cobalt, etc., on a carrier such as alumina, diatomaceous earth, etc. |

Conditions of a Typical Alkylation Treatment

| | |
|---|---|
| Temperature (°C) | 400 to 380 |
| Pressure (kg/cm$^2$) | Ordinary pressure to 150 |
| LHSV | 0.2 to 10 |
| Propylene$^{mol}$/Fraction$^{mol}$ | 0.2 to 10 |
| Catalyst: | Silica-alumina, silica-magnesia, zeolite, solid phosphoric acid, etc. |

Generally, the alkylation is conducted using a lower olefin such as an ethylene, propylene, or butylene in the presence of an acid catalyst such as silica-alumina gel, etc.

Generally, the viscosity of the alkylated polycyclic aromatic compounds can be varied at will by controlling, inter alia, the molecular weight of the raw material (i.e., the residual oils) and the degree of alkylation. Specifically, as the molecular weight of the raw material becomes lower, the viscosity becomes lower. The residual oils generally have a high viscosity and are near-solids but by alkylating such oils, the viscosity will decrease. Continuing the alkylation (i.e., adding more alkyl groups) beyond a certain point will result in further increases in the viscosity.

Therefore, one may produce alkylated polycyclic aromatic compounds of the above type having any viscosity above 2000 cps at 25° C by considering the above factors.

According to the present invention, an under-coating composition is applied using a mixture of 10 to 500 parts by weight of the above-mentioned alkylated polycyclic aromatic compounds and 100 parts by weight of a urethane resin, the mixture further containing a hardening agent for the resin and, if necessary, a filler and a solvent; and, then, an over-coating composition is applied using a coating composition containing, as the vehicle, a curable resin such as an epoxy resin, a urethane resin, or an alkyd resin.

The painting method of this invention has the advantages that the period of time between the under-coating and the over-coating can be greatly shortened as compared with conventional painting methods and no stripping of the coated layers occurs when completed. Also, when the painted articles are subjected to a long weathering test, no bleeding-out phenomenon occurs, and when a titanium white-containing paint is applied to the over-coat, no discoloring occurs. Also, the water resistance and the corrosion resistance of the layers thus-painted are the same as, or superior to, those layers obtained using a coal tar-blended paint.

Thus, the painting method of this invention overcomes the abovementioned disadvantages of conventional coal tar-blended paints, the coloring range of the paint is greatly enlarged, and further, the most inexpensive alkyd paint among the various baking paints can be used for the over-coating.

The preferred substrate is metal, most preferably iron or steel.

The following examples illustrate several embodiments of the production of the raw materials for the paint used in the method of this invention and several embodiments of the painting method of this invention.

MANUFACTURED EXAMPLE 1

A crude oil from North Sumatra was sprayed into a high temperature steam at 2,000° C to cause the pyrolysis thereof and from the tarry materials thus obtained were recovered fractions having boiling points of 250° to 450° C. These fractions were introduced in a reactor containing a cobalt-molybdenum-alumina type desulfurization catalyst together with hydrogen under a pressure of 35 kg/cm$^2$, a temperature of 410° C, a LHSV of 0.5, and a molar ratio of hydrogen to the fraction of 6 to remove impurities from the fractions. Then, the fractions thus refined were alkylated by introducing them into a reactor containing a silica-alumina catalyst together with ethylene in an ethylene/fractions molar ratio of 10 under the following conditions: a pressure of 40 kg/cm$^2$, a LHSV of 0.5, and a temperature of 300° C. Thereafter, by distilling the alkylation product, the following two components A and B were obtained. The properties thereof are also shown below.

| | Component A | Component B |
|---|---|---|
| Temperature of removing low boiling matter | 380°C | 430°C |
| Specific gravity | 1.10 | 1.20 |
| Viscosity (cps)(at 25°C) | 120,000 | 42,000 |
| Volatile matter (%) | 0 | 0 |
| Molecular weight (VPO) | 310 | 460 |
| Aromatic ring-forming proton density (NMR) | 36% | 50% |
| Elementary analysis S, N, O | none | none |

MANUFACTURED EXAMPLE 2

The fractions recovered from the tarry materials as in Example 1 were introduced in a reactor containing a cobalt-molybdenum-alumina type desulfurization catalyst together with hydrogen under a pressure of 35 Kg/cm$^2$, a temperature of 350° C, a LHSV of 0.5, and a molar ratio of hydrogen to the fraction of 5 to remove impurities from the fractions. Then, the fractions thus refined were alkylated by introducing them into a reactor containing a silica-alumina catalyst together with propylene in a propylene/fractions molar ratio of 3.0 under the following conditions: a pressure of 20 Kg/cm$^2$, a LHSV of 0.5, and a temperature of 200° C. Thereafter, by distilling the alkylation product, the following component C was obtained. The properties thereof are also shown below.

| | Component C |
|---|---|
| Temperature of removing low boiling matter | 380°C |
| Specific gravity | 0.99 |
| Viscosity (cps) (at 25° C) | 10,000 |
| Volatile matter (%) | 0 |

MANUFACTURED EXAMPLE 3

A bottom oil formed during the production of ethylene by an outer heating-type steam decomposition of naphtha was recovered. The bottom oil was subjected to the desulfurization as in Example 1 and then a part of the bottom oil thus desulfurized was alkylated with ethylene as in Example 1 and then distilled to remove low boiling matters of lower than 400° C to provide Component D. The properties of this component are shown below.

|  | Component D |
|---|---|
| Specific gravity | 1.08 |
| Viscosity (cps) (at 25°C) | 140,000 |
| Volatile matter (%) | 0 |
| Molecular weight (VPO) | 320 |
| Aromatic-forming proton density (NMR) | 40% |
| Elementary analysis S, N and O | none |

Chemical Co., Japan, and is a prepolymer of tristyrolpropane and toluene diisocyanate.

The coating composition for the under-coating was prepared by mixing the abovementioned components using each of the components A, B, C and D prepared in the above examples as the alkylated polycyclic aromatics and applied to an iron plate to a thickness of 800–1,000 microns. After drying the coating for 1 day at normal temperature, the over-coating composition described above was applied to the under-coat thus formed to a thickness of 50 microns. The excellent results obtained by the method of this invention are shown in the following table.

| Aromatic Component | Over Coat | Water resistance(1) | Light Fastness(2) | Weathering Resistance(3) | (4) Bending Strength | Impact resistance(5) | Bleeding(6) |
|---|---|---|---|---|---|---|---|
| A | Urethane Resin Composition | no change | no change | no change | passed | 1 kg-50cm passed | none |
| B | do. | do. | do. | do. | do. | do. | do. |
| D | do. | do. | do. | do. | do. | do. | do. |
| C | do. | do. | do. | do. | do. | do. | do. |
| A | Alkyd resin Composition | do. | do. | do. | do. | do. | do. |
| B | do. | do. | do. | do. | do. | do. | do. |
| D | do. | do. | do. | do. | do. | do. | do. |
| C | do. | do. | do. | do. | do. | do. | do. |

(1) Water resistance (immersed in distilled water for 3 months at 40°C);
(2) Light Fastness (light exposed for 200 hours by means of a fade-o-meter);
(3) Weathering resistance (allowed to stand outdoors for 6 months);
(4) Bending strength (⅜ inch, mandrel test);
(5) Impact resistance (Du Pont-type test); and
(6) Bleeding (observed after allowing to stand for 6 months).

EXAMPLE 4

This example describes the use of a paint composition containing a urethane resin and the alkylated polycyclic aromatic compounds of Examples 1, 2 and 3.

| Under-coating composition | |
|---|---|
| Urethane resin, Olester No. 1066 (trade name, made by Mitsui Toatsu Kagaku K.K.) | 25 parts by weight |
| Alkylated polycyclic aromatic compound (described below) | 50 parts by weight |
| Colonate L (Trade Name) | 45 parts by weight |
| Over-coating composition | |
| I. Urethane resin composition: | |
| Urethane resin Olester No. 1066 | 25 parts by weight |
| Titanium white | 25 parts by weight |
| Colonate L | 50 parts by weight |
| II. Alkyd resin composition: | |
| Alkyd resin (Phthalkyd 365-70) | 100 parts by weight |
| Titanium white | 40 parts by weight |

Olester No. 1066 is a castor oil modified isocyanate and Colonate L is a hardener made by Hodogaya

What is claimed is:

1. A coated article having excellent water-resistance and corrosion-resistance and which is non-bleeding comprising:
  1. a substrate;
  2. a first layer coated directly on said substrate consisting essentially of 10 to 500 parts by weight of an alkylated polycyclic aromatic compound and 100 parts by weight of a urethane resin, said alkylated polycyclic aromatic compound containing no nitrogen, oxygen or sulfur to the extent detectable by elementary analysis, having a means molecular weight measured by VPO method of from 250 to 600, having an aromatic ring-forming proton density measured by the nuclear magnetic resonance method of from 35 to 80%, having a specific gravity of from 0.95 to 1.10, and, if liquid, having a viscosity of at least 2,000 centipoises at 25°C or, if solid, having a softening point of about 25°C; said first layer further consisting essentially of a hardening agent for the urethane resin; and
  3. a second layer coated directly on said first layer consisting essentially of a curable resin selected from the group consisting of an epoxy, a urethane resin and an alkyd resin.

2. A method of coating a substrate to provide said substrate with excellent water-resistance and excellent corrosion-resistance and to make said substrate non-bleeding comprising:
1. applying to said substrate an undercoating composition consisting essentially of 10 to 500 parts by weight of an alkylated polycyclic aromatic compound, 100 parts by weight of a urethane resin and a hardening agent for the urethane resin, said alkylated polycyclic aromatic compound containing no nitrogen, oxygen or sulfur to the extent detectable by elementary analysis, having a mean molecular weight measured by the VPO method of from 250 to 600, having an aromatic ring-forming proton density measured by the nuclear magnetic resonance method of from 35 to 80%, having a specific gravity of from 0.95 to 1.10, having a viscosity of at least 2,000 centipoises at 25° C and having a softening point of about 25° C; and
2. applying to the undercoated substrate an overcoating composition consisting essentially of a curable resin selected from the group consisting of an epoxy resin, a urethane resin and an alkyd resin.

3. The method of claim 2 wherein said alkylated polycyclic aromatic compound is obtained by hydrodesulfurizing and alkylating a residual oil obtained in the thermal cracking of petroleum fractions at temperatures higher than 900° C and subsequently removing low boiling fractions from the resulting product.

4. The method of claim 3 wherein said alkylation step is conducted with a lower olefin selected from the group consisting of ethylene, propylene and butylene.

5. The method of claim 2 wherein said substrate comprises steel.

6. The method of claim 2 wherein the undercoating composition is dried before said overcoating composition is applied thereto.

7. The method of claim 2 wherein said uncoating composition further consists essentially of a filler and a solvent.

* * * * *